UNITED STATES PATENT OFFICE.

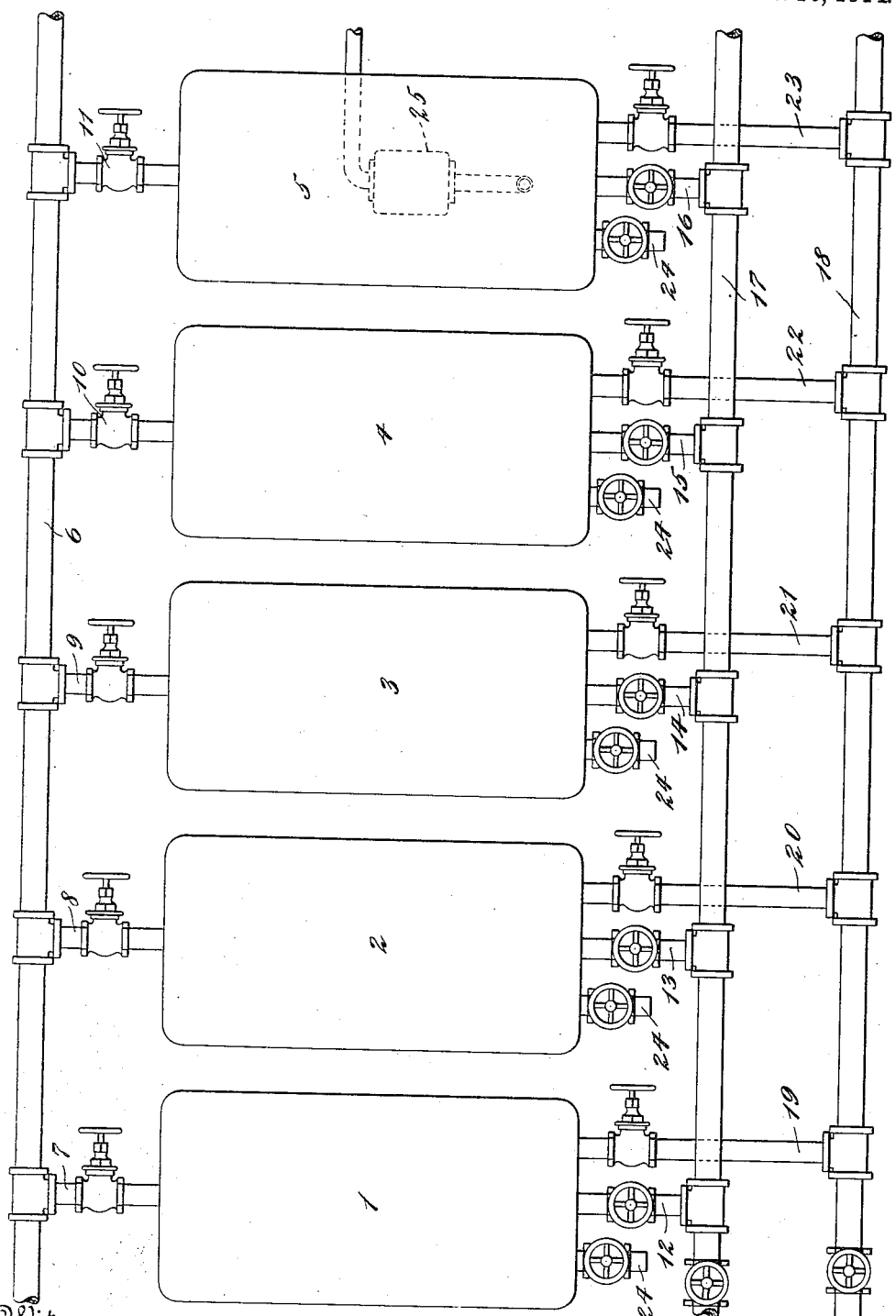

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

METHOD OF HEATING KILNS AND RETORTS.

1,086,716.  Specification of Letters Patent.  Patented Feb. 10, 1914.

Application filed June 24, 1912. Serial No. 705,557.

*To all whom it may concern:*

Be it known that I, DAVID S. JACOBUS, a citizen of the United States, residing at Jersey City, in the county of Hudson and State of New Jersey, have invented certain new and useful Improvements in Methods of Heating Kilns and Retorts, of which the following is a specification.

The present invention relates to a method of operating steam heated drying kilns, and will be understood by reference to the following description taken in connection with the accompanying drawing which is a diagrammatic representation of five kilns in series, with the necessary pipes for conveying the steam to the kilns.

The present invention involves the utilization of superheated steam in steam heated drying kilns in an efficient and economical manner.

The novelty consists in passing steam from a kiln in which superheated steam is admitted, into one or more other kilns where it is condensed, providing thereby a circulation of steam through the kiln which is being heated with superheated steam. If enough circulation is provided through a kiln supplied with superheated steam, the temperature of the kiln will rise above the saturation point of the steam and the kiln may thereby be heated economically with superheated steam, whereas if the steam is condensed in the kiln the greater part of the kiln will be at the temperature of saturated steam at the pressure at which the steam is condensed. A simple way of heating a kiln materially above the temperature of saturated steam would be to blow the superheated steam to waste, but such method would necessarily be an inefficient one as the heat wasted might be, say, ten times or even more than the heat usefully applied to the kiln.

In applying the method two or more kilns are operated together, and if it is desired to raise the temperature of one or more of the kilns to a higher point than the others, superheated steam is blown through one or more of the kilns and is condensed in the other kilns.

Various applications of the invention may be explained by the accompanying drawing.

I have shown, for the purpose of describing the possibilities of my invention, five kilns, designated as 1, 2, 3, 4 and 5. These are connected to a main 6 for supplying superheated steam through valve connections 7, 8, 9, 10 and 11. Valve connections 12, 13, 14, 15 and 16 lead to a second main 17 for conducting the steam discharged from one or more of the kilns to others of the series. A third main 18 may be connected to the kilns through valve connections 19, 20, 21, 22 and 23 for admitting saturated steam. Each kiln is also provided with a valve blow off 24 and a trap 25.

Assuming that it is desired to heat kilns 1 and 2 to a higher degree of heat than the others, the valves in the connections 7 and 8 would be opened to admit superheated steam of the full temperature. The valves 9, 10 and 11 would be closed to shut off the supply of superheated steam to the other kilns. The superheated steam would be allowed to flow through the kilns 1 and 2 into the steam main 17 and from thence into the other kilns. To do this all of the valves in the connections leading from the main 17 to the kilns would be opened. The steam which flows through the kilns 1 and 2 would be condensed in kilns 3, 4 and 5 and would not be wasted. Kilns 3, 4 and 5 would necessarily be at a lower temperature than 1 and 2, as it would be necessary for the temperature to fall to that corresponding to saturated steam at the pressure of condensation in order that the steam may be condensed in the kilns 3, 4 and 5. By a proper regulation of the amount of steam which is allowed to flow through the kilns 1 and 2, the temperature of these kilns may be adjusted.

In case it is necessary to cut out any one of the kilns the valves leading to it may be closed and the other kilns may be operated in the way just described.

In some instances it is desirable to increase the temperature of the kilns at the latter end of the heating process. This can be done by first supplying steam to the kiln from the main 17 and afterward supplying the steam directly from the main 6 and discharging it into the main 17.

Where it is necessary to accurately adjust the temperatures, saturated steam could be used in connection with superheated steam; in the drawing the main 18 is shown for this purpose. Saturated steam might also be used for the first part of a process and superheated steam at the end of the process, so as to bring the temperature to a higher point at the end of the process than at the beginning. Again, in case the kiln or kilns through which the superheated steam is being circulated from the main 6 become too hot the amount of superheated steam flowing to them can be diminished by partly closing the valve leading to the same, and should there be any lack of steam in the other kilns, this can be supplied by partly opening the valves leading from the superheated steam main.

It is evident from the examples given of the methods of operation that all the heat in the steam is utilized and that the method may be used to advantage for work where the amount of heat required at a temperature above that of the saturated steam is small compared with that required at the temperature of saturation. It is also applicable where it is desired to keep some of the kilns at a hotter temperature than others.

What I claim and desire to secure by Letters Patent of the United States is:—

1. A method of operating a series of steam heated drying kilns consisting in admitting superheated steam to a kiln through which it is passed without condensation, the steam then passing to one or more other kilns in which it is condensed.

2. A method of operating a series of steam heated drying kilns consisting in admitting saturated steam to a plurality of kilns, then shutting off the saturated steam to one of said kilns and admitting superheated steam to said latter kiln through which it is passed without condensation, the steam then passing from said latter kiln to others of the series in which it is condensed.

3. A method of operating a series of steam heated drying kilns consisting in admitting superheated steam to a plurality of said kilns in some of which the steam is condensed, and through others of which it is passed without condensation and condensed in the other kilns.

4. A method of operating a series of steam heated drying kilns consisting in admitting superheated steam to a plurality of said kilns in some of which the steam is condensed, and through others of which it is passed and only partially condensed and is led to other kilns where it is further condensed.

5. A method of operating a series of steam heated drying kilns consisting in admitting saturated steam to one or more kilns and superheated steam to one or more kilns, the steam supplied to the superheated steam kilns being circulated through the same and condensed either wholly or in part in the kilns supplied with saturated steam.

In testimony whereof I have hereunto signed my name in the presence of two subscribing witnesses.

DAVID S. JACOBUS.

Witnesses:
E. Camp,
E. P. Terry.